United States Patent
Marlor et al.

(10) Patent No.: US 6,674,001 B2
(45) Date of Patent: *Jan. 6, 2004

(54) SOLDER GLASS AND ELECTRICAL DEVICE EMPLOYING SAME

(75) Inventors: Richard C. Marlor, Beverly, MA (US); Paul W. Salvi, Danville, NH (US)

(73) Assignee: Osram Sylvania Inc., Danvers, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 34 days.

(21) Appl. No.: 08/393,617

(22) Filed: Feb. 23, 1995

(65) Prior Publication Data

US 2002/0023764 A1 Feb. 28, 2002

(51) Int. Cl.⁷ .................................................. H01K 5/06
(52) U.S. Cl. ................ 174/50.64; 174/50.61; 174/152 GM
(58) Field of Search ............... 174/50.64, 50.61, 174/152 GM; 501/15, 49; 445/43, 44, 26

(56) References Cited

U.S. PATENT DOCUMENTS

| | | | | |
|---|---|---|---|---|
| 2,995,468 A | * | 8/1961 | Steiger | 501/49 X |
| 3,420,683 A | * | 1/1969 | Ikeda et al. | 501/49 X |
| 3,588,315 A | | 6/1971 | Levand et al. | 174/50.64 |
| 3,742,117 A | * | 6/1973 | Levand, Jr. et al. | 174/50.64 |
| 4,293,325 A | * | 10/1981 | Chirino et al. | 501/49 X |
| 4,342,943 A | * | 8/1982 | Weaver | 501/49 X |
| 4,492,814 A | | 1/1985 | Snell et al. | 174/50.64 |
| 4,493,944 A | | 1/1985 | Snell et al. | 174/50.64 |
| 4,521,641 A | | 6/1985 | Snell et al. | 174/50.64 |
| 4,857,486 A | * | 8/1989 | Ebata et al. | 501/15 X |

\* cited by examiner

Primary Examiner—Dean A. Reichard
Assistant Examiner—Angel R. Estrada
(74) Attorney, Agent, or Firm—William H. McNeill; Robert F. Clark

(57) ABSTRACT

A solder glass which has, by weight: about 60 to 67% $Sb_2O_3$; about 27 to 32% $B_2O_3$; and from greater than 0 to 10% ZnO. The glass has a softening point between 388 and 466° C., depending on the ZnO content. The glass can be employed as a molten seal in electrical devices such as tungsten halogen or metal halide lamps.

4 Claims, 2 Drawing Sheets

SOLDER GLASS AND ELECTRICAL DEVICE EMPLOYING SAME

TECHNICAL FIELD

This invention relates to solder glasses and more particularly to such glasses which become molten at from about 388° C. to about 466° C. and can be employed with quartz-to-metal seals in electrical devices.

BACKGROUND ART

Certain electrical devices, e.g., tungsten halogen and metal halide lamps, employ envelopes comprising a high percentage of silica, such as fused silica, fused quartz or Vycor, the latter being a 96% silica glass. To achieve a hermetic seal between the glass and the lead-in conductors of the electrical device it is common practice to employ a pinch seal. The lead-in conductors generally comprise a very thin foil portion of molybdenum which forms the actual hermetic seal and an outer lead-wire of a refractory metal which can also be molybdenum. One end of the lead-wire is attached to the foil and the other end extends exteriorly of the pinch. This relatively heavy outer lead-wire does not form a hermetic seal with the quartz because of its relatively large diameter and the difference in thermal expansion coefficients between the two. In actual practice, because the formation of the pinch seal does not allow the quartz to flow completely around and against the full periphery of the outer lead-wire, a small capillary passage is left therebetween. The thin foil can thus be exposed to atmospheric oxygen via the capillary passages. At elevated temperatures, say above 350° C., oxidation of the foil can occur, resulting in breakage of the electrical connection to the outer lead-wire.

It has been suggested that this problem can be reduced by filling the capillary with a solder glass which becomes molten when the device is operated, thus forming a molten seal. Specifically, a lead borate glass has been suggested; however, the use of such a glass requires the use of platinum or platinum-clad lead-wires since lead borate attacks molybdenum. Further, U.S. Pat. No. 3,588,315 suggests binary glasses such as antimony borate and ternary glass compositions of antimony borate with the addition of small amounts of molybdenum trioxide or tungsten trioxide.

Additionally, U.S. Pat. Nos. 4,492,814; 4,521,641, and 4,493,944, disclose improvements in the antimony borate systems wherein the glasses include, respectively, 5% of: $Bi_2O_3$; $V_2O_3$; and PbO. All of the latter glasses have melting points at about 350° C.

Recently, it has been discovered that lamps which operate at higher wattages and which have higher operating seal temperatures (i.e., above 400° C.) have not been adequately protected from moly-foil oxidation, resulting in premature lamp failures.

DISCLOSURE OF THE INVENTION

It is, therefore, an object of the invention, to obviate the disadvantages of the prior art.

It is another object of the invention to provide a solder glass that is suitable for use with electrical devices having seal temperatures in the neighborhood of 400° C.

It is yet another object of the invention to provide such a glass which is not deleterious to molybdenum.

These objects are accomplished, in one aspect of the invention, by a solder glass comprising, by weight, about 60 to 67% $Sb_2O_3$; about 27 to 32% $B_2O_3$; and from greater than 0 to 10% ZnO. This glass can have a softening point between about 388° C. with 1% ZnO to about 466° C. at 10% ZnO. In a preferred composition, the glass comprises, by weight, about 63.6% $Sb_2O_3$; about 29.4% $B_2O_3$; and about 7% ZnO and has a softening point of about 440° C.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
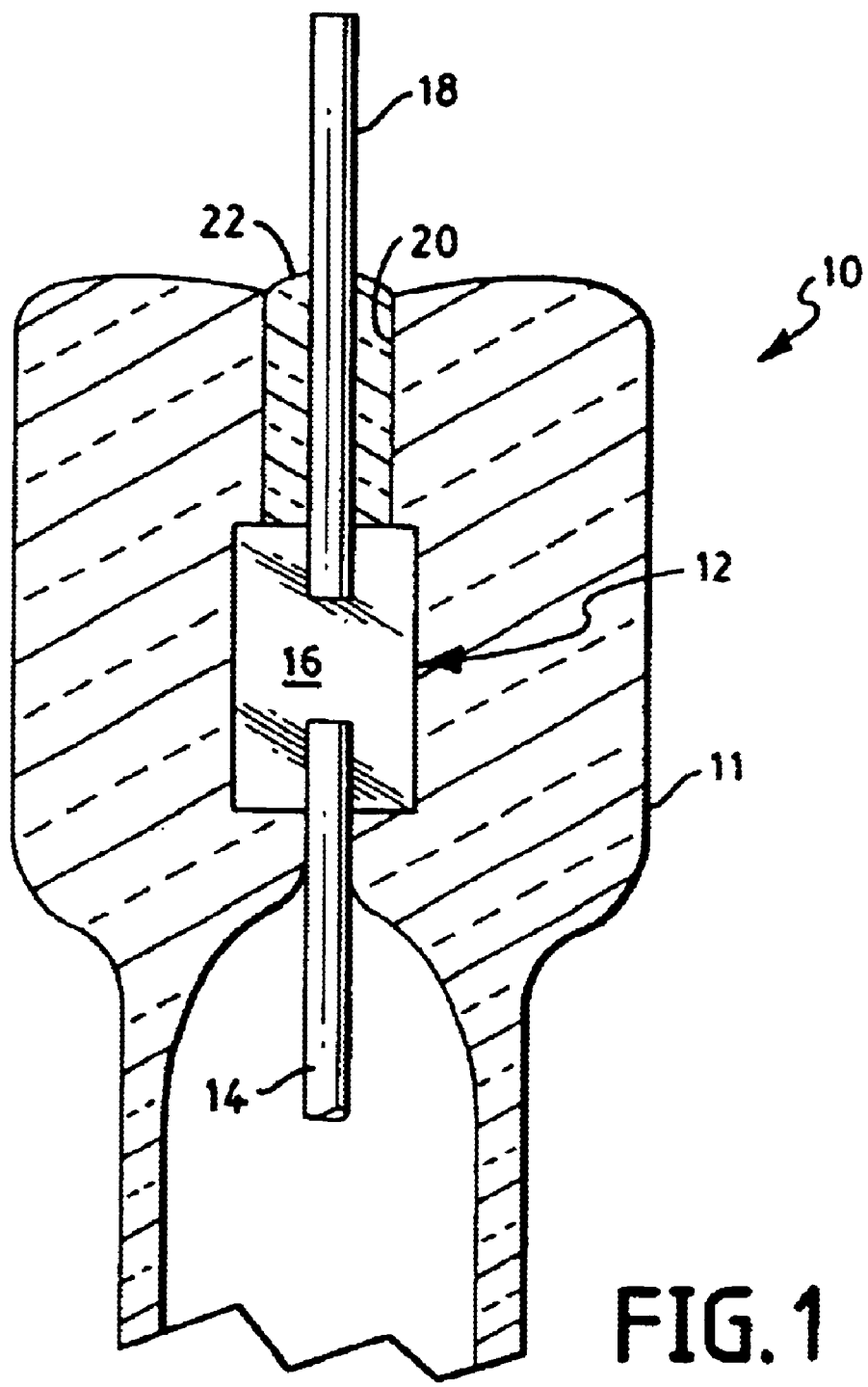
FIG. 1 is a partial, sectional view, somewhat exaggerated in size, of the end of an electrical device employing the invention.

Referring now to the drawings with greater particularity, there is shown in FIG. 1 a seal for an electrical device 10, which can be a tungsten halogen or metal halide lamp. Only a single end of the device 10 is illustrated, it being understood that in a double-ended device the end not shown would be similar. It is also to be understood that the invention is equally applicable to single-ended devices wherein a plurality of lead-in connectors are adjacent to one another. Device 10 has a body 11 of substantially fused silica or quartz or some other high silica content glass. By high silica content is meant a glass having more than 90% silica.

At least one electrically conductive member 12 is sealed in the end of the device 10. The member 12 comprises a proximal portion 14 which projects within the body 11, an intermediate thin foil portion 16, as of molybdenum which forms the hermetic seal with body 11, and a distal portion 18 which projects exteriorly of the body 11.

As noted above, the formation of such a pinch seal leaves a small capillary passage 20 surrounding the distal portion 18. The passage 20 may have a width on the order of 0.001 inch.

Figure 2:
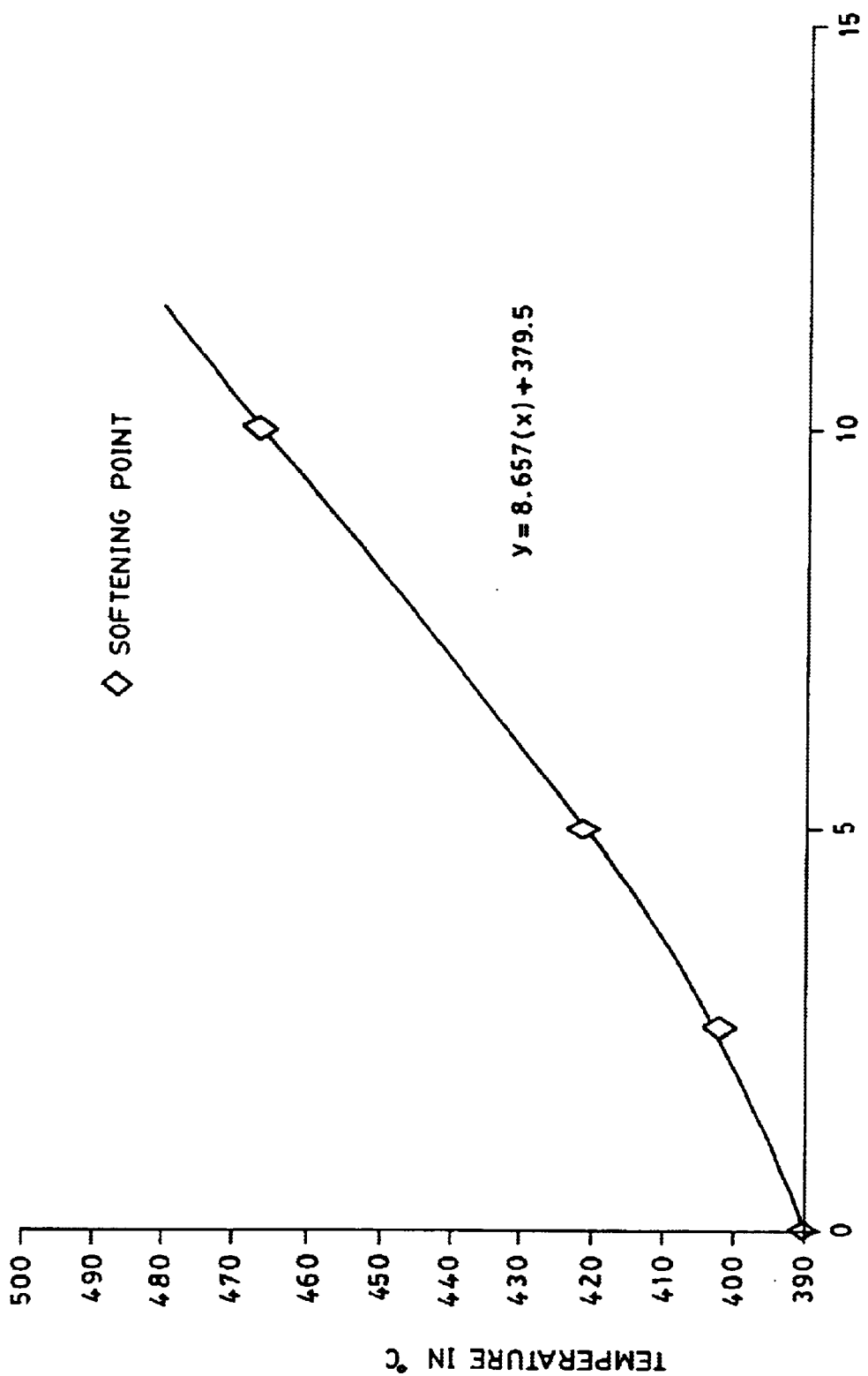
FIG. 2 is a graph illustrating the softening point range with ZnO additions.

To prevent oxidation of the foil 16 at elevated temperatures, i.e., above 380° C., the capillary passage 20 is filled with a solder glass 22. The glass 22 comprises from about 60 to 67% $Sb_2O_3$; about 27 to 32% $B_2O_3$; and from greater than 0 to 10% ZnO, with all percentages being by weight. Such a glass will have a softening point between 380° C. to 466° C., depending upon the amount of ZnO included, as shown in FIG. 2. In a preferred embodiment, the composition is, by weight, about 63.6% $Sb_2O_3$; about 29.4% $B_2O_3$; and about 7% ZnO. This latter composition has a softening point of 440° C. and thus protects the foil during high temperature operation of the seal.

In the manufacture of the solder glass it has been found to be expedient to add the ZnO to an antimony oxide, boron oxide batch, as zinc borate ($3ZnO.2B_2O_3$) because of the lower melting point of the borate (980° C. v. 1800° C. for ZnO). Further, in batch, the fluxing action of the components, particularly the boron, allows the glass to be melted at 850° C.

The glass is formulated by weighing out, for example, 636.00 kilograms of antimony trioxide and 135.71 kilograms of zinc borate and 353.39 kilograms of boric acid ($H_3BO_3$) as the source for the boron trioxide ($B_2O_3$). The materials are thoroughly mixed and then melted. The melting is preferably carried out in alumina crucibles at a temperature of 850° C. for 15 minutes and then the melt is stirred to homogenize. After the stirring, the crucible is removed from the melting furnace and placed in a drawing furnace at 550° C. As noted above, the melt can be prepared at 850° C. The melts can be made under an inert atmosphere such as nitrogen, but melting in air is preferred. The formulation listed above totals 1125.10 kilograms which will yield 1000 kilograms of solder glass, the remainder being comprised of volatile gases which are lost in the firing, having the final composition of 63.60 wgt. % $Sb_2O_3$; 29.40 wgt % $B_2O_3$; and 7 wgt % ZnO. The melt, after cooling can be cast into rods or fibers or drawn into rods or fibers directly from the crucible. The fibers have a yellow color and are opaque. Nickel crucibles can be used, in place of the alumina crucibles; albeit, the solder glass will then have a green coloration.

The solder glass so made can be applied to the seal by positioning the device 10 vertically with the capillary to be filled uppermost. The body is heated at the seal area and the rod of solder glass is melted and allowed to flow into the capillaries. If the device is double-ended, it is inverted and the procedure repeated. If the solder glass is applied immediately after the pinch seal is formed, the fiber of sealing glass can be pressed into the capillary directly, the residual heat from the pinch sealing process being sufficient to rapidly melt the solder glass which will then fill the void. The solder glass is very easily observed filling the capillary thus providing a visual confirmation of the seal completion.

Thus, there is provided a solder glass having a higher softening point for use with higher wattage lamps which generate higher seal temperatures.

While there have been shown and described what are at present considered the preferred embodiments of the invention, it will be apparent to those skilled in the art that various changes and modifications can be made herein without departing from the scope of the invention as defined by the appended claims.

What is claimed is:

1. A seal for electrical devices which comprise a body of substantially fused silica and at least one electrically conductive member sealed therein, said member comprising a proximal portion projecting within said body, an intermediate thin foil portion hermetically sealed within said body, and a distal portion projecting outside said body, and a capillary passage surrounding said distal portion and extending to said intermediate portion, said capillary passage being filled with a solder glass comprising, by weight: about 60 to 67% $Sb_2O_3$; about 27 to 32% $B_2O_3$; and from greater than 0 to 10% ZnO.

2. The seal of claim 1 wherein said solder glass comprises, by weight: about 63.6% $Sb_2O_3$; about 29.4% $B_2O_3$; and about 7% ZnO.

3. A solder glass comprising, by weight: about 60 to 67% $Sb_2O_3$; about 27 to 32% $B_2O_3$; and from greater than 0 to 10% ZnO.

4. A solder glass according to claim 3 wherein said solder glass comprises, by weight: about 63.6% $Sb_2O_3$; about 29.4% $B_2O_3$; and about 7% ZnO.

* * * * *